March 2, 1954  S. A. HOWORTH ET AL  2,670,561
FISH DISGORGER
Filed June 8, 1951
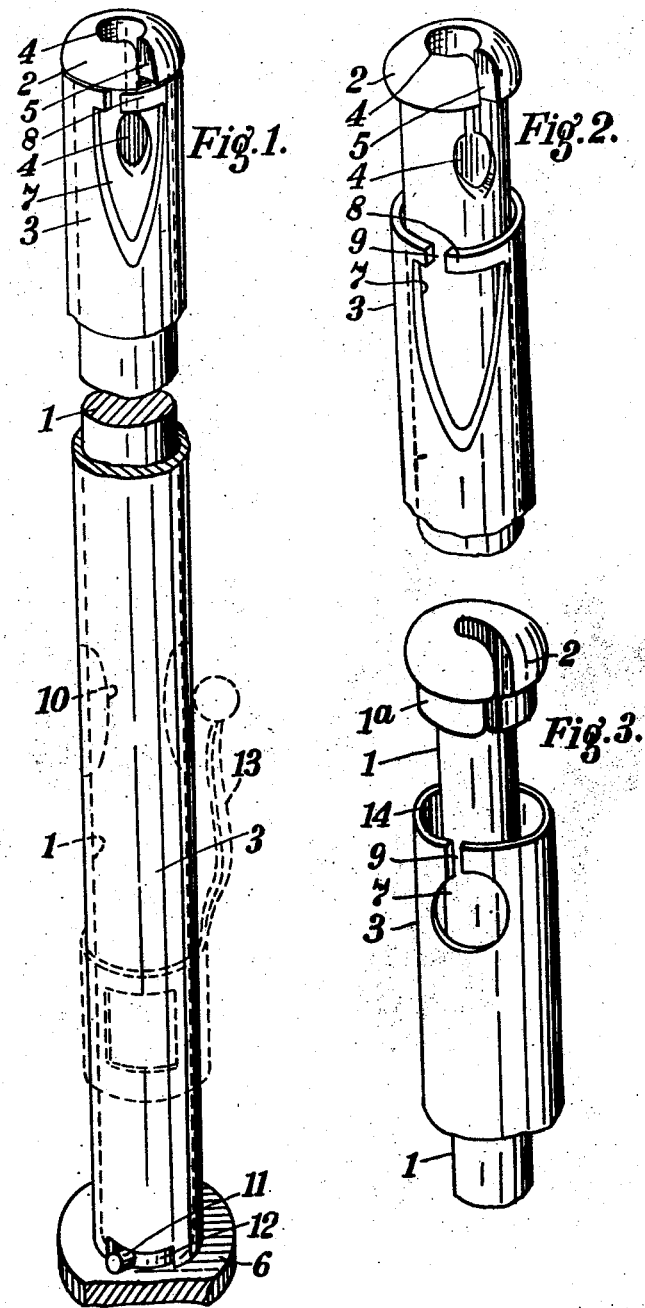
Inventor
SYDNEY ALFRED HOWORTH AND TOM SCOTT
By Linton & Linton
Attorneys Patented Mar. 2, 1954

2,670,561

UNITED STATES PATENT OFFICE 2,670,561

FISH DISGORGER

Sydney Alfred Howorth and Tom Scott, Mansfield, England

Application June 8, 1951, Serial No. 230,523

Claims priority, application Great Britain June 9, 1950

3 Claims. (Cl. 43—53.5)

This invention concerns an improved fish disgorger which is employed for extracting a fish hook from the mouth of a fish which has been caught by rod and line.

It is an object of the invention to provide a disgorger which may be readily engaged with the fishing line, and held engaged, with little or no possibility of it becoming disengaged until the fishing hook has been removed from the fish's mouth.

With this object in view, the invention provides a fish disgorger comprising inner and outer relatively-rotatable members each having at the same end a passageway or cavity open both to the end and the side, said passageways or cavities being so placed that they may be brought into and out of register by relative rotation of the members to receive the fishing line when in register and to imprison the line slidably in the inner one when not in register.

Conveniently the said members are of slender elongated form, for example of pencil-like size, and the inner member may have an enlarged head to abut the end of the outer member the said passageway or cavity extending through that head.

In some embodiments of the invention there extends through one end of each of said rotatable members a passageway for a fishing line, and each member has a slot leading laterally to the passageway in such manner that by relative rotation of the members the slots may be brought into register with each other for the lateral passage of the line through them into and out of the passageway, and out of register for preventing the line from withdrawing laterally from the inner passage. The said members may be relatively movable in opposite directions for the said purposes and stop means may be provided to limit the extent of the movements.

A preferred form of the invention comprises an outer tubular member and an inner rod-like member, the latter being the longer and having an integral head at one end of the same outer diameter as the tubular member with an attached head at the other end, and the said passageway or cavity being at the first-named end.

Means are preferably provided to facilitate engagement of the members by different parts of the hands, and in the said preferred form such means may comprise the attached head so far as the inner member is concerned and cut-away portions in the tube so far as the outer member is concerned. A pocket-gripping clip may also be provided on the device, secured usually to the outer member.

It is to be understood that the expression fishing line includes gut, or trace or other tackle situated between the rod and the hook.

The accompanying drawing illustrates two of many possible forms of the invention.

Fig. 1 is a perspective view of one example of the invention, partly broken away to show the interior construction and with the line-receiving passageways out of register;

Fig. 2 is a similar view of the upper end of the disgorger but with the inner and outer members displaced axially to show the construction more clearly; and Fig. 3 is a like view to Fig. 2 but illustrating a second example of the invention.

Referring first to Figs. 1 and 2, the fish disgorger there shown would be of pencil-like size. More specifically it comprises an inner rod 1 (in some modifications this rod would be a tube), having an enlarged head 2 at one end, and an outer tube 3 closely-fitting and rotatably mounted on the rod. The head 2 at its largest part has the same outer diameter as the tube 3. At the same end as the head 2, the rod 1 is formed with a passageway 4 (for a fishing line), this passage consisting of axial and radial portions extending diagonally or open to the end face of the rod and to the side thereof a short distance from said end (if the inner member is a tube the passageway is formed by merely providing a hole in the wall of the tube a short distance from its end face).

There is also provided a slot 5 formed in part in the head 2 and in part in the shank of the rod 1, said slot 5 extending in depth radially of the rod and substantially parallel to the axis of the rod from the end face thereof, so as to break into the passageway 4. At the other end of the rod 1 there is provided a second enlarged head 6 which is knurled and which may conveniently consist of a headed screw or a headed nut in or on the end of the rod.

The outer tube 3 is of slightly less length than the distance between the inner faces of the two heads 2 and 6 on the rod 1 and at that end of the outer tube 3 nearest the first or slotted head 2 an opening 7 is formed registering with the inner end of the passageway 4; this opening 7 is formed a short distance from the tube end, so as to leave a narrow annular part 8 of the tube at the end thereof, and this narrow part 8 has a slot or gap 9 formed in it similar to the slot 5 formed in the rod 1. The arrangement is such that the outer tube 3 may be rotated in opposite directions on the rod 1 to bring the slots 5 and 9 into and out of axial alignment as desired, the opening 7 in the outer tube 3 being of sufficient width to register with the passageway 4 in each angular position of the outer tube on the rod.

Any convenient means may be provided to assist in the turning of the outer tube 3 on the rod 1 and conveniently for this purpose part of the outer tube is cut away at opposite sides substantially centrally of the length of the device to provide apertures exposing the rod; these are shown in broken lines at 10. The outer tube 3 is thus capable of being readily gripped by the finger and thumb of one hand at the location of the apertures 10. Desirably, the outer tube 3 has only a limited rotational movement and stop means are provided to effect the limitation. Such means comprise lateral projections or pegs 11 on the rod 1 immediately adjacent the second head 6 and the outer tube 3 has cut-outs 12 for receiving the projections 11 in such manner that the outer tube is capable of rotation only within the limits determined by the circumferential length of the cut-outs 12. A clip 13 (shown in broken lines) may be provided on the outer tube 3 for attaching the device to a pocket in the user's clothing, if desired.

In use, the device is conveniently held by one hand with the finger and thumb of that hand gripping the outer tube in the region of the apertures 10 and with the knurled head 6 of the rod engaged in the palm of the same hand, said head 6 being, if desired, also engaged by one of the fingers of the hand to prevent rotation of the rod 1. The device is then engaged with the fishing line by giving the slotted end of the tube 3 a rotational movement to bring the slots 5 and 9 into register and then entering the line into the aligned slots, so that the line passes laterally through the slots into the passageway 4 in the end of the rod 1. With the line thus engaged in the passageway 4, the outer tube 3 is turned by the thumb and finger to move the slot 9 in the outer tube 3 out of alignment with the slot 5 in the rod 1, so that the line is then prevented from disengaging laterally from the passageway 4. With the device thus engaged with the line it may be moved along the line down to the hook in the fish's mouth without becoming disengaged from the line, and when the slotted end of the device (head 2) engages the hook (for which purpose the slotted head of the rod is rounded or tapered), the hook can be removed in customary manner.

Referring now to Fig. 3, the rod 1 is of less diameter but has an enlarged portion 1a below the head 2, such portion normally fitting the tube 3 rotatably. Also, the opening 7 in the tube 3 is smaller than and of different shape from that in Figs. 1 and 2. By reason of the smaller diameter of the rod 1, which leaves an annular space 14 for the accommodation of the fishing line, the head 2 requires only the slot 5, that slot extending axially through the enlargement 1a so as to break into the said space 14.

What we claim is:

1. A fish disgorger comprising an inner solid rod having an enlarged head at each end, an outer tube rotatable on said rod and having its ends bearing against said enlarged heads of said inner rod, said rod having a radially extending slot provided in an end portion thereof and the head thereof at that end, said tubular portion having a longitudinally extending slot provided in the end thereof adjacent said slotted head of said tube and positioned so as to be capable of being brought into and out of register with said rod slot by relative rotation of said rod and said tube, said tube further having a relatively large opening therethrough communicating with said tube slot, and means for limiting the rotation between said tube and said rod, and the enlarged head on the end of said rod opposite the slotted end extending beyond said outer tube and serving as a knob by which the rotation of said rod relative to said tube may be accomplished.

2. A fish disgorger comprising an inner solid rod having an enlarged head at each end, an outer tube rotatable on said rod and having its ends bearing against said enlarged heads of said inner rod, said rod having a cylindrical axially extending recess provided in one end thereof and a relatively narrow radially extending slot communicating with said recess, said rod further having an enlarged opening communicating with the inner end of said slot and opening into said recess, said tubular member having an enlarged opening provided in an end portion thereof adjacent said rod slotted end and a longitudinally extending slot in the end thereof communicating with said tube opening and positioned so as to be capable of being brought into and out of register with said rod slot by relative rotation between said rod and said tube, and means for limiting the rotation between said tube and said rod and the enlarged head on the end of said rod opposite the slotted end extending beyond said outer tube and serving as a knob by which the rotation of said rod relative to said tube may be accomplished.

3. A fish disgorger comprising an inner solid rod having an enlarged head at each end, an outer rotatably mounted tube positioned on said rod with its ends confined between said enlarged heads, said rod having a radially and longitudinally extending slot provided in one end portion thereof including the enlarged head thereof, said tube having a substantially circular opening provided in the end portion thereof adjacent said slotted end of said rod and a restricted passageway extending from the end of said tube adjacent said enlarged head to said circular opening positioned so as to be capable of being brought into and out of register with said rod slot by relative rotation between said rod and said tube, and means for limiting the rotation between said tube and said rod and the enlarged head on the end of said rod opposite the slotted end extending beyond said outer tube and serving as a knob by which the rotation of said rod relative to said tube may be accomplished.

SYDNEY ALFRED HOWORTH.
TOM SCOTT.

References Cited in the file of this patent

UNITED STATES PATENTS

| Number | Name | Date |
| --- | --- | --- |
| 2,289,810 | Tallmadge | July 14, 1942 |
| 2,455,013 | Klinicki | Nov. 30, 1948 |
| 2,493,142 | Hutton | Jan. 3, 1950 |

FOREIGN PATENTS

| Number | Country | Date |
| --- | --- | --- |
| 586,925 | Great Britain | Oct. 27, 1933 |